(12) United States Patent
Hu et al.

(10) Patent No.: US 12,528,208 B2
(45) Date of Patent: Jan. 20, 2026

(54) ROBOT JOINT CONFIGURATION DETERMINING METHOD, ROBOT USING THE SAME AND COMPUTER READABLE STORAGE MEDIUM

(71) Applicant: UBTECH ROBOTICS CORP LTD, Shenzhen (CN)

(72) Inventors: Yisen Hu, Shenzhen (CN); Wenguang Wang, Shenzhen (CN); Hongyu Ding, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 972 days.

(21) Appl. No.: 17/704,011

(22) Filed: Mar. 25, 2022

(65) Prior Publication Data

US 2023/0046296 A1    Feb. 16, 2023

Related U.S. Application Data

(63) Continuation of application No. PCT/CN2021/127155, filed on Oct. 28, 2021.

(30) Foreign Application Priority Data

Aug. 16, 2021    (CN) .......................... 202110937653.2

(51) Int. Cl.
*B25J 19/00*    (2006.01)
*B25J 9/10*    (2006.01)
*G06F 30/20*    (2020.01)

(52) U.S. Cl.
CPC ............ *B25J 19/007* (2013.01); *G06F 30/20* (2020.01); *B25J 9/103* (2013.01)

(58) Field of Classification Search
CPC ........ B25J 19/007; B25J 9/103; B25J 9/1641; B25J 9/1605; B25J 17/00; G06F 30/20;
(Continued)

(56) References Cited

U.S. PATENT DOCUMENTS

| 2015/0248121 A1 * | 9/2015 | Nilsson .................. | B25J 9/1641 318/569 |
|---|---|---|---|
| 2023/0240778 A1 * | 8/2023 | Blake ..................... | B25J 9/1653 700/245 |

FOREIGN PATENT DOCUMENTS

CN    112743574 A    5/2021

OTHER PUBLICATIONS

ISR for PCT/CN2021/127155.
Written opinions of ISA for PCT/CN2021/127155.

* cited by examiner

*Primary Examiner* — Rehana Perveen
*Assistant Examiner* — Angel Calle

(57) ABSTRACT

A robot joint configuration determining method, a robot using the same, and a computer readable storage medium are provided. The method includes: simulating a joint model of a first joint of the robot using first motion deviation data to obtain first result data; simulating the joint model using second motion deviation data to obtain second result data; taking the motion deviation data corresponding to one of the first result data and the second result data meeting one or more preset conditions as a target motion deviation data for the first joint; and determining type information of a reducer in a configuration information of the first joint based on the target motion deviation data. In the present disclosure, the motion deviation of the first joint that is relatively accurate can be obtained through the results of the two simulations.

20 Claims, 8 Drawing Sheets

(58) Field of Classification Search
CPC .......... G06F 30/17; G05B 2219/41032; G05B 2219/41358
See application file for complete search history.

ROBOT JOINT CONFIGURATION DETERMINING METHOD, ROBOT USING THE SAME AND COMPUTER READABLE STORAGE MEDIUM

CROSS REFERENCE TO RELATED APPLICATIONS

The present disclosure is a continuation-application of International Application PCT/CN2021/127155, with an international filing date of Oct. 28, 2021, which claims foreign priority of Chinese Patent Application No. 202110937653.2, filed on Aug. 16, 2021 in the State Intellectual Property Office of China, the contents of all of which are hereby incorporated by reference.

BACKGROUND

1. Technical Field

The present disclosure relates to robot control technology, and particularly to a robot joint configuration determining method, a robot using the same, and a computer readable storage medium.

2. Description of Related Art

With the rapid development of artificial intelligence (AI), robots have been widely used, and the requirements for the robots are becoming more and more stringent. In order to meet the requirement of high torque (moment) density when manufacturing robot, the use of reducers is essential. However, there is a backlash during the operation of the reducer, and the performance of the robot will be affected by the backlash to a certain extent.

The influence of the backlash of the reducer on the robot is difficult to measure. In the manufacturing process of the robot, if the reducer with smaller backlash is adopted, the total cost will be high; otherwise; otherwise, if the low-priced reducer is adopted, unsmooth operation of the robot may be caused due to the larger backlash of the low-priced reducer. Therefore, how to choose suitable reducers is a problem that needs to be solved in the manufacturing process of the robots.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, hut do not preclude the presence or addition of one or a plurality of other features, integers, steps, operations, elements, components and/or combinations thereof.

It is also to be understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the specification and the claims of the present disclosure, the terms "first", "second", "third", and the like in the descriptions are only used for distinguishing, and cannot be understood as indicating or implying relative importance.

References such as "one embodiment" and "some embodiments" in the specification of the present disclosure mean that the particular features, structures or characteristics described in combination with the embodiment(s) are included in one or more embodiments of the present disclosure. Therefore, the sentences "in one embodiment," "in some embodiments," "in other embodiments," "in still other embodiments," and the like in different places of this specification are not necessarily all refer to the same embodiment, but mean "one or more but not all embodiments" unless specifically emphasized otherwise. The terms "comprising", "including", "having" and their variants mean "including but not limited to" unless specifically emphasized otherwise.

Figure 1:
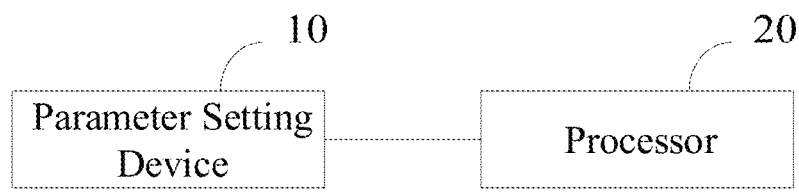
FIG. 1 is a schematic diagram of an application scenario of a robot joint configuration determining method according to an embodiment of the present disclosure.

FIG. 1 is a schematic diagram of an application scenario of a robot joint configuration determining method according to air embodiment of the present disclosure. The above-mentioned robot joint configuration determining method may be used to provide information for choosing a reducer corresponding to a joint in a robot. In which, there is a parameter setting device 10 used to set simulation data of the joint to be simulated, and a processor 20 used to obtain the simulation data of the joint to be simulated from the parameter setting device 10 and simulate the joint model of the joint to be simulated based on the simulation data so as obtain result data of the simulation of the joint. Then, the motion deviation of the joint to be simulated may be determined based on the result data, and the type of the appropriate reducer may be provided based on the motion deviation.

The robot joint configuration determining method according to the embodiments of the present disclosure will be described in detail below with reference to FIG. 1.

Figure 2:
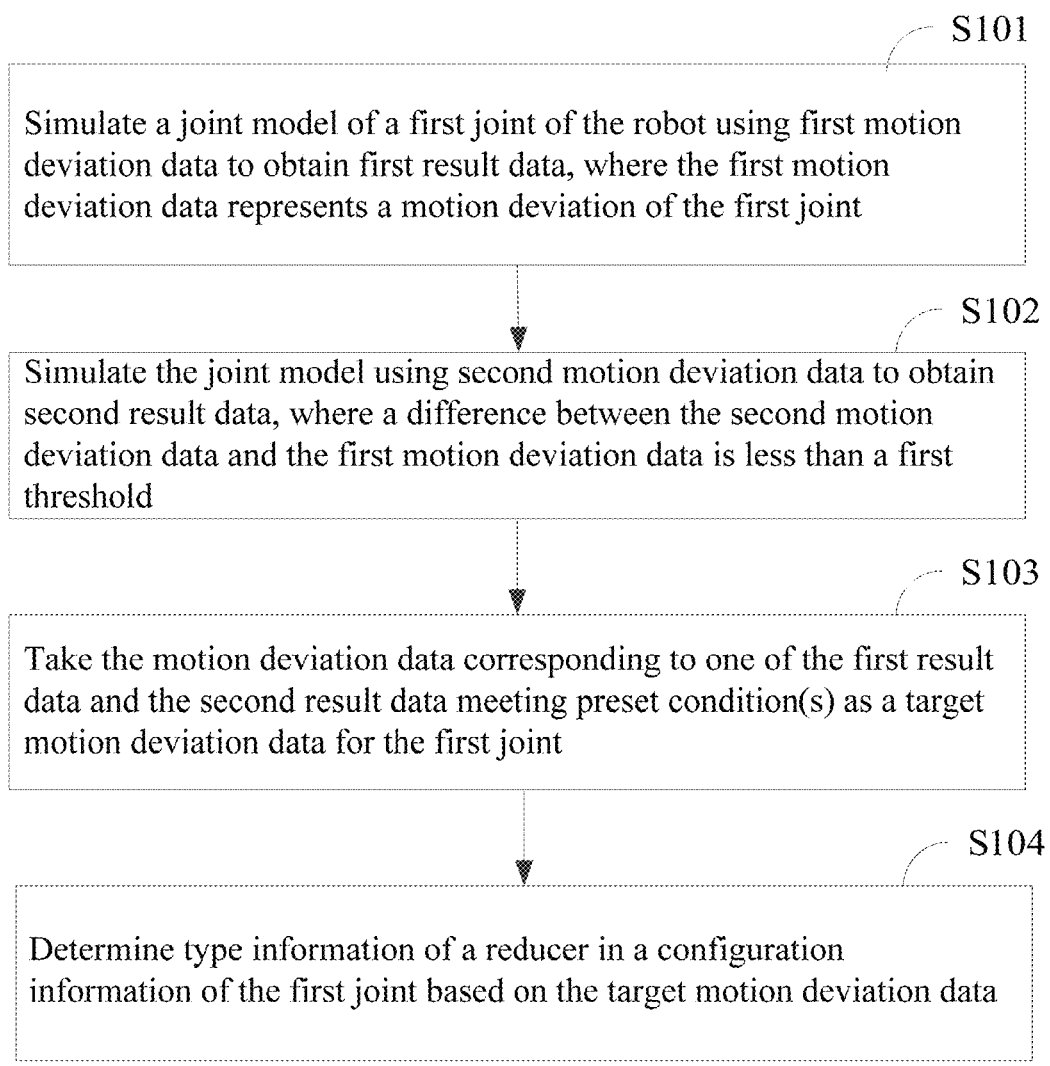
FIG. 2 is a flow chart of the robot joint configuration determining method of FIG. 1.

FIG. 2 is a flow chart of the robot joint configuration determining method of FIG. 1. In this embodiment, the robot joint configuration determining method is a computer-implemented method executable for a processor of a robot. The method may be implemented through a robot joint configuration determining apparatus shown in FIG. 7 or a robot shown in FIG. 8. As shown in FIG. 2, the method may include the following steps.

S101: simulating a joint model of a first joint of the robot using first motion deviation data to obtain first result data, where the first motion deviation data represents a motion deviation of the first joint.

In this embodiment, due to the gap related to the joints which is caused by the backlash of the reducer is difficult to quantify, the choosing of the reducer has always been a difficult problem in the design of robots. The gap related to the joints in the robot which is caused by the backlash of the reducer is quantified through simulation, so as to provide type information of the reducer that can be used to determine the reducer with a suitable price and meeting the needs of the robot.

In which, the reducer is an independent component composed of a gear drive, a worm drive, and a gear-worm drive enclosed in a rigid housing, which is often used as a reduction drive between a prime mover and a working machine. One reducer is disposed at each joint of the robot, where the reducer in the robot is used to improve and ensure the accuracy of the robot. The backlash of the reducer is also called the return trip gap, which means a slight angular displacement of the input end of the reducer when the input end generates the rated torque of ±−2% while the output end of the reducer is fixed and the input end rotates clockwise and counterclockwise. The gap related to the joint may also be understood as the virtual position of the joint, that is, the movement deviation of the joint. For example, if a joint is set to move at an angle of 30 degrees, but the joint is actually moved at 31 degrees because of the influence of the backlash of the reducer, the movement deviation of 1 degree is the gap related to the joint.

In this embodiment, when simulating the first joint, a simulation model of the first join needs to be established first. As an example, the simulation model of the first joint may include a first joint and a passive joint connected in series with the first joint, where the motion range of the passive joint may be determined based on the first motion deviation data.

In this embodiment, the first movement deviation data is used to represent the movement deviation of the first joint during movement. The first motion deviation data may be set as required. For example, the first motion deviation data may be set to ±0.1 degrees, that is, the maximum virtual position of the first joint may be 0.2 degrees. The first motion deviation data is used to limit the range of the motion of the passive joint. The motion range of the passive joint is used to simulate the virtual position of the first joint, that is, the motion deviation of the first joint.

In this embodiment, when simulating the joint model, it is also necessary to obtain data such as motion plan and control algorithm for the first joint that is for controlling the first joint.

S102: simulating the joint model using second motion deviation data to obtain second result data, where a difference between the second motion deviation data and the first motion deviation data is less than a first threshold.

In this embodiment, the second motion deviation data may be obtained based on the first motion deviation data by, for example, increasing or decreasing based on the first motion deviation data. The second motion deviation data may also be a piece of data selected from a preset data group. The first threshold may be set as required, for example, setting to 2, 3, 4, or the like.

In this embodiment, when the second motion deviation data is used for simulation, the motion range of the passive joint may be determined based on the second motion deviation data.

In one embodiment, the first result data may be the data obtained by the last simulation, and the second result data may be the data obtained by the current simulation.

As an example, if the first result data is the data obtained by the third simulation and the second result data is the data obtained by the fourth simulation, and the fourth simulation is denoted as the current simulation, the third simulation will be the last simulation of the fourth simulation, that is, the last simulation of the current simulation.

In one embodiment, the simulation corresponding to the first result data may be a simulation that differs from that corresponding to the second result data by a preset number of times.

As an example, if the first result is the data obtained from the fifth simulation, the second result data may be the data obtained from the seventh, eighth, ninth, or other time of simulation.

S103: taking the motion deviation data corresponding to one of the first result data and the second result data meeting preset condition(s) as a target motion deviation data for the first joint.

In this embodiment, the first result data may include at least one of a first torque when the first joint moves, a first angle when the first joint moves, and a first posture of the first joint.

In this embodiment, the second result data may include at least one of a second torque when the first joint moves, a second angle when the first joint moves, and a second posture of the first join.

In this embodiment, the preset condition(s) may be determined according to the performance requirements of the robot, Specifically, if the first result data includes the first torque, the first angle, and the first posture, the preset condition may include that the corresponding torque (i.e., the first torque,) is within a first range, the corresponding angle (i.e., the first angle) is within a second range, and the corresponding posture (i.e., the first posture) is within a third range.

In this embodiment, the motion deviation data corresponding to the result data will meet the performance requirements of the robot only when the result data meets the preset condition(s). Therefore, the motion deviation data corresponding to the result data meeting the preset condition(s) needs to be used as the target motion deviation data of the first joint.

S104: determining type information of a reducer in a configuration information of the first joint based on the target motion deviation data.

In this embodiment, since different reducers have different backlashes, the motion deviations caused by different backlashes are different. Therefore, the type information of the appropriate reducer may be obtained according to the target motion deviation data by, for example, searching the type information from a mapping table of the target motion deviation data and the type information. In which, the type information of the reducer may include information such as the type, the model, and the manufacturer of the reducer. The price of the reducer with a larger backlash will be cheaper, and that of the reducer with a smaller backlash will be more expensive. Since the total cost will be increased when adopting the reducers with smaller backlash, according to the type information of the reducer that is determined by the robot joint configuration determining method of the present disclosure, the reducers with larger backlash and lower price may be adopted to achieve the purpose of optimizing the total cost in the case that the needs of the robot can also meet by using the reducer with a relatively larger backlash.

As an example, if there are multiple types of reducers can meet the requirements of the target motion deviation data, the reducer with a favorable price (e.g., a lowest price) may be chosen.

In this embodiment, the motion deviation of the first joint that is relatively accurate can be obtained through the results of two simulations by simulating a joint model of a first joint of the robot using first motion deviation data to obtain first result data; simulating the joint model using second motion deviation data to obtain second result data; taking the motion deviation data corresponding to one of the first result data and the second result data meeting one or more preset conditions as a target motion deviation data for the first joint; and determining type information of a reducer in a configuration information of the first joint based on the target motion deviation data. The appropriate reducer may be chosen according to the motion deviation, so that the chosen reducer can not only meet the requirements of the first joint but also achieve the cost optimization, thereby avoiding high total cost of the robot or the used reducers do not meet the needs of the robot. In addition, in this embodiment, the influence of different reducers on the robot may be analyzed by the result data obtained through different motion deviation data.

In one embodiment, before using the second motion deviation data to simulate the joint model, the second motion deviation data may also be determined first.

For example, before step 102, the above-mentioned method may further include:

S201: obtaining the second motion deviation data by adjusting the first motion deviation data in accordance with a preset step size based on the first result data, where the preset step size is less than or equal to the first threshold.

In this embodiment, the preset step size may be set as required. For example, the preset step size may be 1, 2, 3, or the like.

In this embodiment, the adjusting the first motion deviation data in accordance with the preset step size may include increasing or reducing the first motion deviation data by the preset step size.

In this embodiment, if the second motion deviation data is obtained based on the first motion deviation data, the first result data and the second result data are the data obtained from two consecutive simulations. Correspondingly, if there is the result data that meets the preset condition(s) in the result data obtained from the two consecutive simulations, the target motion deviation may be determined according to the motion deviation data corresponding to the result data meeting the preset condition(s) in the result data obtained from the two consecutive simulations.

In this embodiment, by using the first motion deviation data to obtain the second motion deviation data, the obtained second motion deviation data can be more grounded and regular, and the simulations can be more regular.

Figure 3:
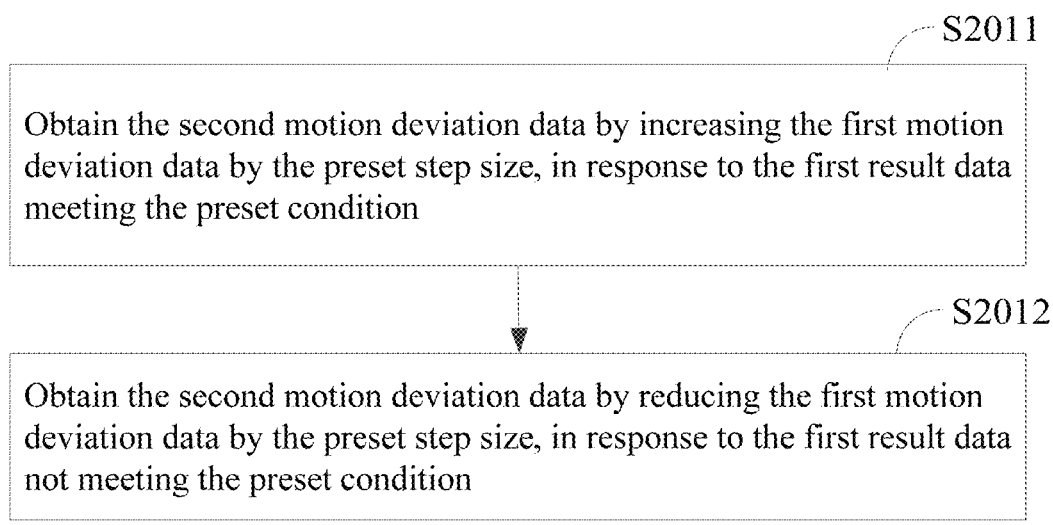
FIG. 3 is a flow chart of determining a second motion deviation data in the method of FIG. 1.

FIG. 3 is a flow chart of determining a second motion deviation data in the method of FIG. 1. As shown in FIG. 3, in one embodiment, step S201 may include the following steps.

S2011: obtaining the second motion deviation data by increasing the first motion deviation data by the preset step size, in response to the first result data meeting the preset condition.

In this embodiment, it is known that the larger the motion deviation data is, the more disadvantageous the stability of the robot is, and the less the performance requirements of the robot can meet. The larger the motion deviation data, the larger the backlash of the reducer, and the larger the backlash of the reducer, the cheaper the price of the reducer.

In this embodiment, if the first result data meets the preset condition(s), it means that the first motion deviation data can meet the performance requirements of the robot, and the first motion deviation data may be turned up to continue to determine whether the adjusted first motion deviation data that is denoted as the second motion deviation data meets the performance requirements of the robot.

S2012: obtaining the second motion deviation data by reducing the first motion deviation data by the preset step size, in response to the first result data not meeting the preset condition.

In this embodiment, if the first result data does not meet the preset conditions, it means that the first motion deviation data does not meet the performance requirements of the robot, and the first motion deviation data may be turned down to continue to determine whether the adjusted first motion deviation data that is denoted as the second motion deviation data meets the performance requirements of the robot.

In this embodiment, it may determine to turn up or down decrease the first motion deviation data according to the first result data, so that the adjustment of the first motion deviation data can be reasonable, the tuning direction (i.e., up or down) can be shore clear, and the unnecessary tuning and unnecessary emulation can be avoided to speed up the obtaining of the configuration information.

Figure 4:
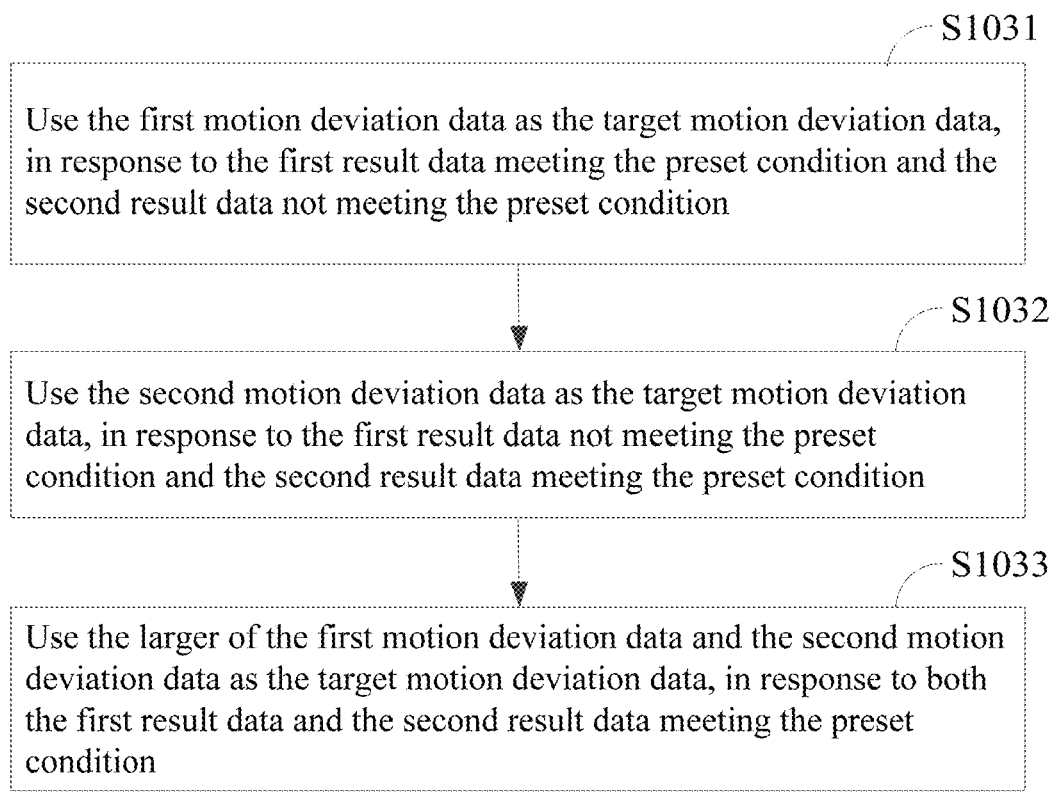
FIG. 4 is a flow chart of determining a target motion deviation data in the method of FIG.

FIG. 4 is a flow chart of determining a target motion deviation data in the method of FIG. 1. As shown in FIG. 4, in one embodiment, step S103 may include the following steps.

S1031: using the first motion deviation data as the target motion deviation data, in response to the first result data meeting the preset condition and the second result data not meeting the preset condition.

In this embodiment, when simulating the joint model, initial motion deviation data may be set in advance, then the initial motion deviation data may be used to simulate the joint model so as to obtain third result data. If the third result data meets the preset condition(s), the initial motion deviation data may be turned up progressively according to the preset step size, and the initial motion deviation data after each adjustment is used to simulate the joint model until the first notion deviation data is obtained, and then the first motion deviation data is used to simulate the joint model so as to obtain the first result data. The first result data meets the preset condition. Then, the first motion deviation data is increased by the preset step size to obtain the second motion deviation data. The second motion deviation data is used to simulate the joint model so as to obtain the second result data. The second result data does not meet the preset condition. Based on the forgoing simulation, the maximum motion deviation data that meets the performance requirements of the robot during the simulation, that is, the maximum value of the motion deviation data for which the simulation result meets the preset condition(s) may be obtained, and the maximum motion deviation data may be used as the target motion deviation data. The target motion deviation data is the maximum motion deviation data that meets the performance requirements of the robot.

In this embodiment, if the first result data meets the preset condition and the second result data does not meet the preset condition, the first motion deviation data may be used as the target motion deviation data. Since the first result data and the second result data are obtained from two consecutive simulations, the first motion deviation data will be the maximum motion deviation data that meets the performance requirements of the robot during the simulation.

S1032: using the second motion deviation data as the target motion deviation data, in response to the first result data not meeting the preset condition and the second result data meeting the preset condition.

In this embodiment, when simulating the joint model, the initial motion deviation data may be set in advance, and then the initial motion deviation data may be used to simulate the joint model so as to obtain the third result data. If the third result data does not meet the preset condition, the initial motion deviation data may be turned down progressively according to the preset step size, and the initial motion deviation data after each adjustment is used to simulate the joint model until the first motion deviation data is obtained, and then the first motion deviation data is used to simulate the joint model so as to obtain the first result data. The first result data does not meet the preset condition. Then, the first motion deviation data is reduced by the preset step size to obtain the second motion deviation data. Based on the forgoing simulation, the maximum motion deviation data that meets the performance requirements of the robot during the simulation, that is, the maximum value of the motion deviation data for which the simulation result meets the preset condition(s) may be obtained, and the maximum motion deviation data may be used as the target motion deviation data. The target motion deviation data is the maximum motion deviation data that meets the performance requirements of the robot.

In this embodiment, if the first result data does not meet the preset condition and the second result data meets the preset condition, the second motion deviation data may be used as the target motion deviation data. Since the first result data and the second result data are obtained from two consecutive simulations, the second motion deviation data will be the maximum motion deviation data that meets the performance requirements of the robot during the simulation.

S1033: using the lamer of the first motion deviation data and the second motion deviation data as the target motion deviation data, in response to both the first result data and the second result data meeting the preset condition.

In this embodiment, if both the first result data and the second result data meet the preset condition(s), it means that both the first motion deviation data and the second motion deviation data can meet the performance requirements of the robot, and the larger one of them may be used as the target motion deviation data because the larger the motion deviation data, the larger the corresponding backlash, and the larger the backlash, the lower the price of the corresponding reducer, hence the total cost can be saved.

In this embodiment, if one of the first result data and the second result data meets the preset condition(s) while the other does not meet the preset condition(s), the maximum motion deviation data that meets the performance requirements of the robot during the simulation may be determined, which lays a foundation for the subsequent determination of the reducer. If both the first result data and the second result data meet the preset condition(s), the larger one of them may be taken as the target motion deviation data, and the motion deviation data closer to the maximum motion deviation data can be obtained, which lays a foundation for the subsequent determination of the reducer, so that the obtained reducer can be more in line with the needs.

Figure 5:
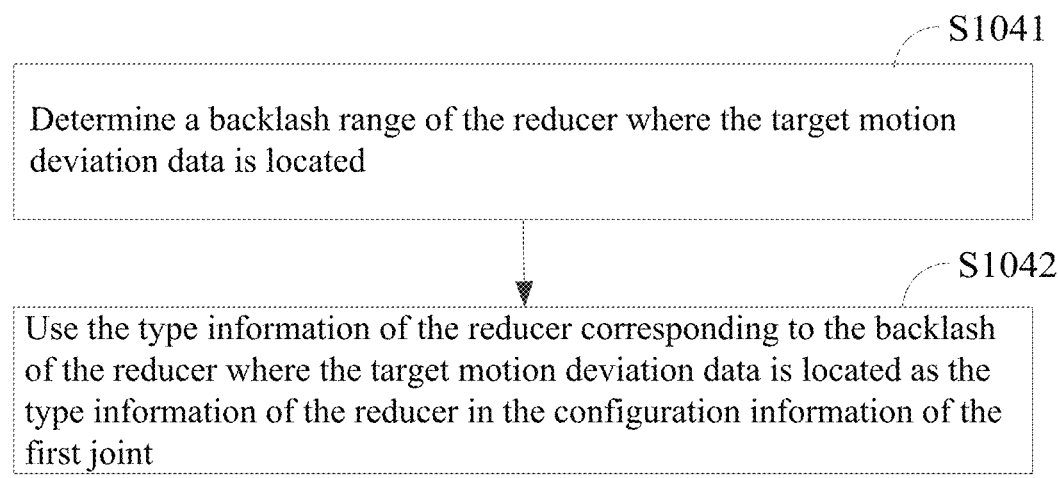
FIG. 5 is a flow chart of a reducer type determining method in the method of FIG. 1.

FIG. 5 is a flow chart of a reducer type determining method in the method of FIG. 1. As shown in FIG. 5, in one embodiment, step S104 may include the following steps.

S1041: determining a backlash range of the reducer where the target motion deviation data is located.

In this embodiment, different reducers correspond to different backlash ranges (i.e., the ranges of the backlash of the reducers). For example, the harmonic reducer corresponds to a first backlash range, the gear reducer corresponds to a second backlash range, and the first backlash range of the harmonic reducer is smaller than the second backlash range of the gear reducer. Therefore, after the target motion deviation data is determined, the backlash range where the target motion deviation data is located may be found.

S1042: using the type information of the reducer corresponding to the backlash of the reducer where the target motion deviation data is located as the type information of the reducer in the configuration information of the first joint.

In this embodiment, after finding the backlash range where the target motion deviation data is located, the type information of the reducer corresponding to the backlash range may be determined. Since the target motion deviation data is the relatively larger motion deviation data to meet the performance requirements of the robot, the reducer determined according to the target motion deviation data will be the reducer with a relatively favorable price, which can relatively reduce the production cost of the robot while not affect the performance of the robot.

As an example, a plurality joints may also be simulated together to determine the information of the reducer corresponding to each of the joints. Taking the walking of a biped robot as an example, the joint configuration determining process may include the following steps.

Figure 6:
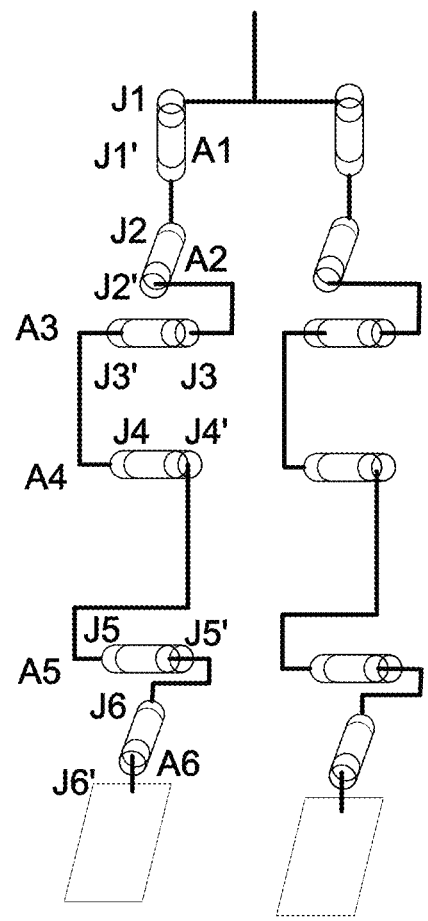
FIG. 6 is a schematic diagram of a leg simulation model of a biped robot according to an embodiment of the present disclosure.

S301: establishing a leg simulation model of two legs of the robot. FIG. 6 is a schematic diagram of the leg simulation model of the biped robot according to an embodiment of the present disclosure. As shown in FIG. 6, the sequential connection sequence of the leg joints in the leg simulation model is J1-J1'-J2-J2'-J3-J3'-J4-J4'-J5-J5'-J6-J6', in which J1, J2, J3, J4, J5 and J6 are active joints represented by axes, and J1', J2', J3', J4', J5' and J6' are passive joints represented by axes to simulate the virtual position of joint. At this time, the rotation axis of the virtual position is the same as that of the corresponding active joint. The rotation axes are A1, A2, A3, A4, A5, and A6, where the rotation axis is the vertical axis of the center of the axis.

Before the simulation starts, the initial motion deviation data, the preset step size, and the like are set in advance, where the motion deviation data is loaded on the passive joints.

S302: simulating the leg simulation model using the initial motion deviation data to obtain a first result parameter of each active joint. For the convenience of description, only the active joint J1 is taken as an example for description, and the simulation of other active points and the choosing process of the corresponding reducer are the same as those of the active joint J1.

S303: determining whether the first result parameter of the active joint meets the preset condition(s), and reducing the initial motion deviation data by the preset step size to obtain the first deviation data if the first result parameter does not meet the preset condition(s);

S304: using the first deviation data to simulate the simulation model so as to obtain a second result parameter, and reducing the first deviation data by the preset step size to obtain the second deviation data if the second result parameters do not meet the preset condition(s); and S305: simulating the simulation model using the second deviation data to obtain a third result parameter, and using the second deviation data as the target motion deviation data if the third result parameter meets the preset condition(s); or S306: determining whether the first result parameter of the active joint. J1 meets the preset condition(s), and increasing the initial motion deviation data by the preset step size to obtain the first deviation data if the first result parameter meets the preset condition(s);

S307: using the first deviation data to simulate the simulation model so obtain the second result parameter, and increasing the first deviation data by the preset step size to obtain the second deviation data if the second result parameters do not meet the preset condition(s); and S308: simulating the simulation model using the second deviation data to obtain a third result parameter, and using the first deviation data as the target motion deviation data if the third result parameter does not meet the preset condition(s).

S309: determining the type information of the reducer in the configuration information of the first joint based on the target motion deviation data.

The target motion deviation data found by the forgoing method will be the maximum motion deviation data that meets the performance requirements of the robot during the simulation, and the reducer determined based on the target motion deviation data will be the reducer that meets the needs of the robot and has the most favorable price.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 7:
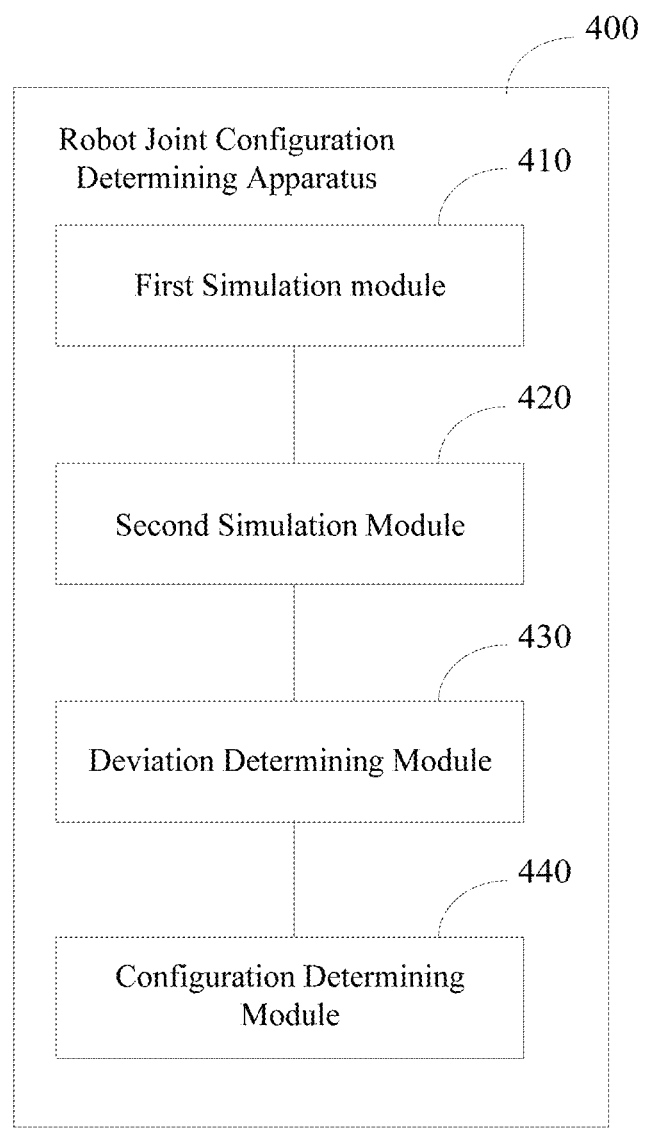
FIG. 7 is a schematic block diagram of a robot joint configuration determining apparatus according to an embodiment of the present disclosure.

FIG. 7 is a schematic block diagram of a robot joint configuration determining apparatus according to an embodiment of the present disclosure. As shown in FIG. 7, a robot joint configuration determining apparatus 400 corresponding to the robot joint configuration determining method in the forgoing embodiments is provided. For the convenience of description, only the parts related to this embodiment are shown.

Referring to FIG. 7, in this embodiment, the apparatus 400 may include a first simulation module 410, a second simulation module 420, a deviation determining module 430, and a configuration determining module 440.

The first simulation module 410 is configured to simulate a joint model of a first joint of the robot using first motion deviation data to obtain first result data, where the first motion deviation data represents a motion deviation of the first joint.

The second simulation module 420 is configured to simulate the joint model using second motion deviation data to obtain second result data, where a difference between the second motion deviation data and the first motion deviation data is less than a first threshold.

The deviation determining module 430 is configured to take the motion deviation data corresponding to one of the first result data and the second result data meeting one or more preset conditions as a target motion deviation data for the first joint.

The configuration determining module 440 is configured to determine type information of a reducer in a configuration information of the first joint based on the target motion deviation data.

In one embodiment, the apparatus 400 may further include:
a calculation module configured to obtain the second motion deviation data by adjusting the first motion deviation data in accordance with a preset step size based on the first result data, where the preset step size is less than or equal to the first threshold.

In one embodiment, the calculation module may be configured to:
obtain the second motion deviation data by increasing the first motion deviation data by the preset step size, in response to the first result data meeting the preset condition; and
obtain the second motion deviation data by reducing the first motion deviation data by the preset step size, in response to the first result data not meeting the preset condition.

In one embodiment, the deviation determining module 430 may be configured to:
use the first motion deviation data as the target motion deviation data, in response to the first result data meeting the preset condition and the second result data not meeting the preset condition;
use the second motion deviation data as the target motion deviation data, in response to the first result data not meeting the preset condition and the second result data meeting the preset condition; and
use the larger of the first motion deviation data and the second motion deviation data as the target motion deviation data, in response to both the first result data and the second result data meeting the preset condition.

In one embodiment, the configuration determining module 440 may be configured to:
determine a backlash range of the reducer where the target motion deviation data is located; and
use the type information of the reducer corresponding to the backlash range of the reducer where the target motion deviation data is located as the type information of the reducer in the configuration information of the first joint.

In one embodiment, the joint model may include a first joint and a passive joint connected in series with the first joint, where a motion range of the passive joint is determined based on one of the first motion deviation data and the second motion deviation data.

In one embodiment, the first result data may include at least one of a first torque when the first joint moves, a first angle when the first joint moves, and a first posture of the first joint.

It should be noted that, the information exchange, execution process and other contents between the above-mentioned device/units are based on the same concept as the method embodiments of the present disclosure. For the specific functions and technical effects, please refer to the method embodiments, which will not be repeated herein.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software function unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

Figure 8:
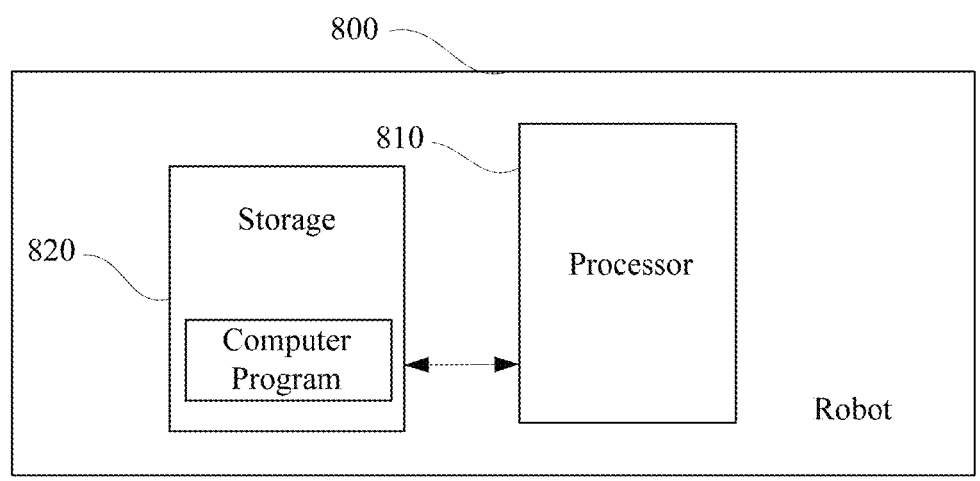
FIG. 8 is a schematic block diagram of a robot according to an embodiment of the present disclosure.

FIG. 8 is a schematic block diagram of a robot according to an embodiment of the present disclosure. As shown in FIG. 8, a robot 800 is provided. In this embodiment, the robot 800 may include a processor 810, a storage 820, and a computer program stored in the storage 820 and executable on the processor 810. When executing (instructions in) the computer program, the processor 810 implements the steps in each of the above-mentioned method embodiments, for example, steps S101-S104 shown in FIG. 2. Alternatively, when the processor 810 executes the (instructions in) computer program, the functions of each module unit in each of the above-mentioned device embodiments, for example, the functions of the modules 410-440 shown in FIG. 7 are implemented.

Exemplarily, the computer program may be divided into one or more modules units, and the one or more modules units are stored in the storage 820 and executed by the processor 810 to realize the present disclosure. The one or more modules/units may be a series of computer program instruction sections capable of performing a specific function, and the instruction sections are for describing the execution process of the computer program in the robot 800.

The terminal device 8 may include, but is not limited to, the processor 410 and the storage 420. It can be understood by those skilled in the art that FIG. 8 is merely an example of the terminal device 8 and does not constitute a limitation on the terminal device 8, and may include more or fewer components than those shown in the figure, or a combination of some components or different components, for example, an input/output device, a network access device, a bus, and the like.

The processor 410 may be a central processing unit (CPU), or be other general purpose processor, a digital signal processor (DSP), an application specific integrated circuit (ASIC), field-programmable gate array (FPGA), or be other programmable logic device, a discrete gate, a transistor logic device, and a discrete hardware component. The general purpose processor may be a microprocessor, or the processor may also be any conventional processor.

The storage 420 may be an internal storage unit of the terminal device 8, and may also be an external storage device of the terminal device 8, for example, a plug-in hard disk, a smart media card (SMC), a secure digital (SD) card, flash card, and the like. The storage 420 is configured to store the computer program 82 and other programs and data required by the terminal device 8. The storage 420 may also be used to temporarily store data that has been or will be output.

The bus may be an industry standard architecture (ISA) bus, a peripheral component interconnect (PCI) bus, an extended industry standard architecture (EISA) bus, or the like. The bus may be divided into address bus, data bus, control bus, and the like. For convenience of representation, the buses in the drawings of the present disclosure are not limited to only one bus or one type of bus.

The robot joint configuration determining method provided by the embodiments of the present disclosure may be applied to robots such as computers, tablet computers, notebook computers, netbooks, and personal digital assistants (PDAs). In the embodiments of the present disclosure, the type of the robot is not limited.

In the embodiments of the present disclosure, a non-transitory computer readable storage medium is further provided. Computer program(s) are stored in the computer readable storage medium, and when the computer program(s) are executed by a processor, the steps in each of the above-mentioned method embodiments of the robot joint configuration determining method can be implemented.

In the embodiments of the present disclosure, a computer program product is further provided. When the computer program product is executed on a robot, the robot will be enabled to implement the steps in each of the above-mentioned method embodiments of the robot joint configuration determining method.

When the integrated unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include at least any entity or device, recording medium, computer memory, read-only memory (ROM), a random access memory (RAM), electric carrier signals, telecommunication signals and software distribution media that can carry computer program codes to the robot, for example, a USB flash drive, a portable hard disk, a magnetic disk, an optical disk, or the like. In some jurisdictions, according to the legislation and patent practice, the computer readable medium cannot be the electric carrier signals and the telecommunication signals.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or a of the units may be selected according to actual needs to achieve the objectives of this embodiment.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented joint configuration determining method for a robot, comprising:
   providing a terminal device comprising a processor and an output device electrically connected to the processor;
   establishing, by the processor, a joint model of a first joint of the robot, wherein the joint model comprises: the first joint and a passive joint connected in series with the first joint;
   simulating, by the processor, the joint model using first motion deviation data to obtain first result data, wherein the first motion deviation data represents a motion deviation of the first joint, and wherein a motion range of the passive joint is determined based on the first motion deviation data when simulating the joint model using the first motion deviation data;
   simulating, by the processor, the joint model using second motion deviation data to obtain second result data, wherein a difference between the second motion deviation data and the first motion deviation data is less than a first threshold, and wherein the motion range of the passive joint is determined based on the second motion deviation data when simulating the joint model using the second motion deviation data;
   determining, by the processor, whether the first result data meets one or more preset conditions, and whether the second result data meets the one or more preset conditions;
   using, by the processor, the first motion deviation data as the target motion deviation data, in response to the first result data meeting the one or more preset conditions and the second result data not meeting the one or more preset conditions;
   using, by the processor, the second motion deviation data as the target motion deviation data, in response to the first result data not meeting the one or more preset conditions and the second result data meeting the one or more preset conditions;
   using, by the processor, the larger of the values of the first motion deviation data and the values of the second motion deviation data as the target motion deviation data, in response to both the first result data and the second result data meeting the one or more preset conditions; and
   determining, by the processor, type information of a reducer in a configuration information of the first joint based on the target motion deviation data, and displaying, by the output device, the type information of the reducer on a user interface.

2. The method of claim 1, wherein before the simulating the joint model using second motion deviation data, the method further comprises:
   obtaining the second motion deviation data by adjusting the first motion deviation data in accordance with a preset step size based on the first result data, wherein the preset step size is less than or equal to the first threshold.

3. The method of claim 2, wherein the obtaining the second motion deviation data by adjusting the first motion deviation data in accordance with the preset step size based on the first result data comprises:
   determining whether the first result data meets the preset condition;
   obtaining the second motion deviation data by increasing the first motion deviation data by the preset step size, in response to the first result data meeting the preset condition; and
   obtaining the second motion deviation data by reducing the first motion deviation data by the preset step size, in response to the first result data not meeting the preset condition.

4. The method of claim 1, wherein the determining the type information of the reducer in the configuration information of the first joint based on the target motion deviation data comprises:
   determining a backlash range of the reducer where the target motion deviation data is located; and
   using the type information of the reducer corresponding to the backlash range of the reducer where the target motion deviation data is located as the type information of the reducer in the configuration information of the first joint.

5. The method of claim 1, wherein the first result data includes at least one of a first torque when the first joint moves, a first angle when the first joint moves, and a first posture of the first joint.

6. The method of claim 1, wherein the preset condition includes a range of at least one of torque, angle and posture.

7. The method of claim 1, wherein a rotation axis of the passive joint is the same as a rotation axis of the first joint.

8. The method of claim 1, further comprising:
when there are multiple types of reducers meeting requirements for the target motion deviation data, determining, by the processor, the type information of the reducer based on prices of the reducers.

9. The method of claim 1, wherein the type information of the reducer comprises: a type, a model and a manufacturer of the reducer.

10. The method of claim 1, wherein, when simulating the joint model, motion plans and control algorithms for the first joint are obtained and used for controlling the first joint.

11. The method of claim 1, wherein a simulation corresponding to the first result data and a simulation corresponding to the second result data differ by a preset number of times, and the preset number of times is greater than 1.

12. A robot, comprising:
a reducer;
an output device;
a processor;
a memory coupled to the processor; and
one or more computer programs stored in the memory and executable on the processor;
wherein, the one or more computer programs comprise:
instructions for establishing a joint model of a first joint of the robot, wherein the joint model comprises: the first joint and a passive joint connected in series with the first joint;
instructions for simulating the joint model using first motion deviation data to obtain first result data, wherein the first motion deviation data represents a motion deviation of the first joint, and wherein a motion range of the passive joint is determined based on the first motion deviation data when simulating the joint model using the first motion deviation data;
instructions for simulating the joint model using second motion deviation data to obtain second result data, wherein a difference between the second motion deviation data and the first motion deviation data is less than a first threshold, and wherein the motion range of the passive joint is determined based on the second motion deviation data when simulating the joint model using the second motion deviation data;
instructions for determining whether the first result data meets one or more preset conditions, and whether the second result data meets the one or more preset conditions; using the first motion deviation data as the target motion deviation data, in response to the first result data meeting the one or more preset conditions and the second result data not meeting the one or more preset conditions; using the second motion deviation data as the target motion deviation data, in response to the first result data not meeting the one or more preset conditions and the second result data meeting the one or more preset conditions; and using the larger of the values of the first motion deviation data and the values of the second motion deviation data as the target motion deviation data, in response to both the first result data and the second result data meeting the one or more preset conditions; and instructions for determining type information of the reducer in a configuration information of the first joint based on the target motion deviation data, and displaying, by the output device, the type information of the reducer on a user interface.

13. The robot of claim 12, wherein the one or more computer programs further comprise:
instructions for obtaining the second motion deviation data by adjusting the first motion deviation data in accordance with a preset step size based on the first result data, wherein the preset step size is less than or equal to the first threshold.

14. The robot of claim 13, wherein the instructions for obtaining the second motion deviation data by adjusting the first motion deviation data in accordance with the preset step size based on the first result data comprise:
instructions for obtaining the second motion deviation data by increasing the first motion deviation data by the preset step size, in response to the first result data meeting the preset condition; and
instructions for obtaining the second motion deviation data by reducing the first motion deviation data by the preset step size, in response to the first result data not meeting the preset condition.

15. The robot of claim 12, wherein the instructions for determining the type information of the reducer in the configuration information of the first joint based on the target motion deviation data comprise:
instructions for determining a backlash range of the reducer where the target motion deviation data is located; and
instructions for using the type information of the reducer corresponding to the backlash range of the reducer where the target motion deviation data is located as the type information of the reducer in the configuration information of the first joint.

16. The robot of claim 12, wherein the first result data includes at least one of a first torque when the first joint moves, a first angle when the first joint moves, and a first posture of the first joint.

17. The robot of claim 12, wherein the preset condition includes a range of at least one of torque, angle and posture.

18. A non-transitory computer readable storage medium for storing one or more computer programs, wherein the one or more computer programs comprise:
instructions for establishing a joint model of a first joint of a robot, wherein the joint model comprises: the first joint and a passive joint connected in series with the first joint;
instructions for simulating the joint model using first motion deviation data to obtain first result data, wherein the first motion deviation data represents a motion deviation of the first joint, and wherein a motion range of the passive joint is determined based on the first motion deviation data when simulating the joint model using the first motion deviation data;
instructions for simulating the joint model using second motion deviation data to obtain second result data, wherein a difference between the second motion deviation data and the first motion deviation data is less than a first threshold, and wherein the motion range of the passive joint is determined based on the second motion deviation data when simulating the joint model using the second motion deviation data;

instructions for determining whether the first result data meets one or more preset conditions, and whether the second result data meets the one or more preset conditions; using the first motion deviation data as the target motion deviation data, in response to the first result data meeting the one or more preset conditions and the second result data not meeting the one or more preset conditions; using the second motion deviation data as the target motion deviation data, in response to the first result data not meeting the one or more preset conditions and the second result data meeting the one or more preset conditions; and using the larger of the values of the first motion deviation data and the values of the second motion deviation data as the target motion deviation data, in response to both the first result data and the second result data meeting the one or more preset conditions; and instructions for determining type information of a reducer in a configuration information of the first joint based on the target motion deviation data, and displaying, by an output device, the type information of the reducer on a user interface.

19. The storage medium of claim 18, wherein the one or more computer programs further comprise:

instructions for obtaining the second motion deviation data by adjusting the first motion deviation data in accordance with a preset step size based on the first result data, wherein the preset step size is less than or equal to the first threshold.

20. The storage medium of claim 19, wherein the instructions for obtaining the second motion deviation data by adjusting the first motion deviation data in accordance with the preset step size based on the first result data comprise:

instructions for obtaining the second motion deviation data by increasing the first motion deviation data by the preset step size, in response to the first result data meeting the preset condition; and instructions for obtaining the second motion deviation data by reducing the first motion deviation data by the preset step size, in response to the first result data not meeting the preset condition.

* * * * *